United States Patent
Tokuda et al.

(10) Patent No.: US 7,052,756 B2
(45) Date of Patent: May 30, 2006

(54) ADHESIVE FOR OPTICAL DISK AND OPTICAL DISK

(75) Inventors: Kiyohisa Tokuda, Saitama (JP); Kazuhiko Ishii, Kawagoe (JP); Go Mizutani, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 382 days.

(21) Appl. No.: 10/477,818

(22) PCT Filed: May 15, 2002

(86) PCT No.: PCT/JP02/04680

§ 371 (c)(1),
(2), (4) Date: Nov. 13, 2003

(87) PCT Pub. No.: WO02/095744

PCT Pub. Date: Nov. 28, 2002

(65) Prior Publication Data

US 2004/0151869 A1    Aug. 5, 2004

(30) Foreign Application Priority Data

May 17, 2001   (JP)   ............... 2001-147187

(51) Int. Cl.
*B32B 3/02*   (2006.01)
(52) U.S. Cl. .................... 428/64.1; 428/65.2; 428/524; 430/270.11

(58) Field of Classification Search ............... 428/65.2, 428/524; 430/270.11
See application file for complete search history.

(56) References Cited

U.S. PATENT DOCUMENTS

| 5,670,260 A | * | 9/1997 | Zajaczkowski et al. | ..... 428/345 |
| 6,017,603 A |   | 1/2000 | Tokuda et al. | ................. 428/64 |

FOREIGN PATENT DOCUMENTS

| EP | 1 152 405 | 11/2001 |
| JP | 04-079042 | 3/1992 |
| JP | 07-121908 | 5/1995 |
| JP | 10-46109 | 2/1998 |
| JP | 2000-186253 | 7/2000 |
| JP | 2002-092961 | 3/2002 |
| JP | 2002-114949 | 4/2002 |
| WO | 98/36325 | 8/1998 |
| WO | 99/63017 | 12/1999 |

\* cited by examiner

*Primary Examiner*—Elizabeth Mulvaney
(74) *Attorney, Agent, or Firm*—Nields & Lemack

(57) ABSTRACT

The present invention provides an adhesive that can provide an excellent durability (reliability) to a bonded optical disk having a translucent reflection film comprising silicone, silver or a silver alloy. The adhesive of the present invention contains a (meth)acrylate monomer (A) having a solution resistance of $1.0 \times 10^{10}$ Ω·cm or more.

7 Claims, No Drawings

ADHESIVE FOR OPTICAL DISK AND OPTICAL DISK

TECHNICAL FIELD

The present invention relates to an adhesive for an optical disk, in particular, an adhesive for an optical disk capable of being cured by irradiation of an ultraviolet ray, and an optical disk bonded with the adhesive, in particular, an optical disk formed by bonding two disk substrates, represented by DVD.

BACKGROUND ART

Under present circumstances, a DVD bonded type optical disk includes, in terms of the constitution of the recording layer, DVD-5 having a recording capacity of about 5 GB with a single recording layer and DVD-9 having a recording capacity of about 9 GB with two recording layers, and DVD-9 having a larger recording capacity is currently being mainstream. The substrate of DVD-9, which is the current mainstream, uses an aluminum compound as a total reflection film, and gold as a translucent reflection film. Since the translucent reflection film must transmit laser, it must be a thin film comparing to the total reflection film, and thus gold, which is a representative example of stable compounds, has been used.

However, since gold is an expensive material, it is being considered that the material of the translucent reflection film is replaced with a silicone compound and a silver compound, which are inexpensive. In order to further increase the recording capacity, investigations for blue laser are being currently advanced. In the case of red laser, there is no problem in transmittance of red laser when the translucent reflection film is gold, silicone, silver or a silver alloy. In the case of blue laser, however, it has a wavelength around 400 nm, and silver exhibits excellent performance in transmittance at that wavelength comparing to the other materials. Therefore, a translucent reflection film using silver is being developed. However, silver is liable to be oxidized comparing to gold, and is chemically unstable. Therefore, a bonded disk using a silver translucent reflection film cannot provide such durability (reliability) that is equivalent to the conventional bonded optical disk using gold as a translucent reflection film. The improvement in durability (reliability) is a significant problem for attaining full-fledged practical application of the silver translucent reflection film.

The invention is to solve the problem with improvement of an adhesive, and an object thereof is to provide an excellent adhesive that can provide such an optical disk that has high durability (reliability) equivalent to the conventional optical disk using a gold translucent reflection film even with an optical disk using a chemically unstable material comparing to gold, such as silver or the like, as a translucent reflection film.

DISCLOSURE OF THE INVENTION

The inventors have made earnest investigations to solve the problem based on an estimation that deterioration, such as corrosion or the like, of a translucent reflection film formed with an unstable material comparing to gold, such as silver, a silver alloy or the like, is caused by a slight electric current or the like due to humidity in an adhesive layer, and as a result, it has been found that in the case where such an adhesive is used that contains a monomer having a solution resistance larger than a certain value as a major component, the humidity resistance is improved, and excellent durability (reliability) can be obtained when a translucent reflection film formed with silver or a silver alloy is bonded, whereby the invention has been completed. Therefore, the invention relates to:

(1) an adhesive for an optical disk containing (A) a (meth)acrylate monomer having a solution resistance of $1.0 \times 10^{10}$ Ω·cm or more, (2) the adhesive for an optical disk according to the above (1), which contains (B-1) a urethane (meth)acrylate and/or (B-2) a bisphenol type epoxy (meth)acrylate, and (C) a photopolymerization initiator, (3) the adhesive for an optical disk according to the above (1) or (2), which contains (D) a (meth)acrylate phosphate compound, (4) the adhesive for an optical disk characterized in that a content of a urethane (meth)acrylate (B-1) is 10% by mass or more but less than 50% by mass, the (meth)acrylate monomer (A) having a solution resistance of $1.0 \times 10^{10}$ Ω·cm or more is 40% by mass or more but less than 90% by mass, and, as the balance, the photopolymerization initiator (C) and, depending on necessity, a (meth)acrylate phosphate compound (D) and a bisphenol A type epoxy (meth)acrylate (B-2) are contained, and a content of said (meth)acrylate monomer (A) is larger than a content of the urethane (meth)acrylate (B-1), (5) the adhesive for an optical disk according to any one of the above (1) to (4), wherein, said (meth)acrylate monomer (A) is at least one selected from a C8 to C18 alkyl monoacrylate, tricyclodecanedimethylol di(meth)acrylate and nonylphenoxyethyl acrylate, (6) a bonded optical disk having a translucent reflection film comprising silicone, silver or a silver alloy, characterized by bonding a substrate having said translucent reflection film and an another substrate with an adhesive of any one of the above (1) to (5), and (7) the optical disk according to the above (6), wherein the bonded optical disk is a DVD.

BEST MODE FOR CARRYING OUT THE INVENTION

The invention will be described in detail below. In the following, "%" and "part" are "part by mass" and "% by mass", respectively, unless otherwise indicated.

In the invention, the (meth)acrylate monomer (A) having a solution resistance of $1.0 \times 10^{10}$ Ω·cm or more is used, whereby damages of the translucent reflection film due to moisture can be reduced and the humidity resistance of a cured product cured by ultraviolet irradiation is improved, and as a result, excellent durability (reliability) of the optical disk can be thus obtained.

The adhesive of the invention is characterized by containing the (meth)acrylate monomer (A) having a solution resistance of $1.0 \times 10^{10}$ Ω·cm or more, and the content thereof is generally 30% or more, preferably 40% or more but less than 99%, and more preferably in a range of less than 90%. Examples of the (meth)acrylate monomer (A) include a $C_8$ to $C_{18}$ alkyl monoacrylate, such as isooctyl acrylate, isodecyl acrylate, lauryl acrylate, stearyl acrylate, tridecyl acrylate and the like, a monofunctional (meth)acrylate, such as isobornyl (meth)acrylate, nonylphenoxyethyl (meth)acrylate and the like, and a polyfunctional (meth)acrylate, such as tricyclodecanedimethylol di(meth)acrylate, 5-ethyl-2-(2-hydroxy-1,1-dimethylethyl)-5-(hydroxymethyl)-1,3-dioxane di(meth)acrylate and ditrimethylolpropane tetra(meth)acrylate and the like. Particularly preferred examples of the (meth)acrylate monomer (A) include said $C_8$ to $C_{18}$ alkyl monoacrylate, tricyclodecanedimethylol di(meth)acrylate, nonylphenoxyethyl acrylate and the like.

The (meth)acrylate monomer (A) may be used singly or in combination of two or more kinds thereof in arbitrary proportions. The content of the component (A) in the adhesive may be in the aforementioned range, and it is preferably in a range of from 30 to 85%, more preferably from 35 to 75%, further preferably from 40 to 75%, and most preferably from 50 to 75%. However, in the case where the adhesive of the invention contains a photopolymerization initiator and components to be added depending on necessity, the upper limit is such a value that is obtained by subtracting the contents thereof.

The adhesive of the invention contains the urethane (meth)acrylate (B-1) and/or the bisphenol type epoxy (meth)acrylate (B-2).

Specific examples of the urethane (meth)acrylate (B-1) include the following polyols and a polyether series urethane acrylate obtained by reaction of an organic polyisocyanate and a hydroxyl group-containing (meth)acrylate compound. These are available as commercial products. Furthermore, it can be also obtained by reacting, in terms of molar ratio of the foregoing raw materials, from 1 to 2 mole of the organic polyisocyanate with from 0.1 to 2 mole of the hydroxyl group-containing (meth)acrylate compound, per 1 mole of the polyols, in the presence or absence of an organic solvent. Among these, a polyether series urethane acrylate having an aromatic ring (hereinafter, simply referred to as an aromatic urethane acrylate) obtained by using any one or both of an organic polyisocyanate having an aromatic ring and a polyol having an aromatic ring is a preferred one.

Examples of the polyol used as a raw material of the (B-1) component include a polyol having a carbon number of from 2 to 8 preferably having from 2 to 4 hydroxyl groups, such as ethylene glycol, propylene glycol, diethylene glycol, 1,4-butanediol, neopentyl glycol, 1,6-hexanediol, 3-methyl-1,5-pentanediol, cyclohexane-1,4-dimethylol and the like, a bisphenol A poly(C2 to C4 alkoxy)diol, such as bisphenol A polyethoxydiol, bisphenol A polypropoxydiol and the like, a polyol of poly(C1 to C5 alkylene)glycol, such as polyethylene glycol, polypropylene glycol, polybutylene glycol, polytetramethylene glycol, trimethylolpropane and the like, a polyester polyol obtained by reacting one kind or two or more kinds of these polyols with a polybasic acid, such as an aliphatic dicarboxylic acid having a carbon number of from 4 to 8 and an aromatic polycarboxylic acid having an aromatic ring having a carbon number of from 6 to 10 and having from 2 to 4 carboxyl groups on the aromatic ring, specifically, succinic acid, phthalic acid, isophthalic acid, terephthalic acid, adipic acid, azelaic acid and the like, a polycaprolactone polyol obtained by reacting the polyol or the polyester polyol with ε-caprolactone and a polycarbonate polyol.

Examples of the organic polyisocyanate used as a raw material of the (B-1) component include an alicyclic diisocyanate, preferably a C5 to C12 alicyclic diisocyanate having from 1 to 2 cyclic rings having a carbon number of from 5 to 6, such as isophorone diisocyanate, dicyclohexylmethane-4,4'-diisocyanate, dicyclopentanyl diisocyanate and the like, an aromatic diisocyanate, preferably a C6 to C12 aromatic diisocyanate having from 1 to 2 aromatic rings having a carbon number of from 6 to 10, such as tolylene diisocyanate, xylylene diisocyanate and the like, and an aliphatic diisocyanate, preferably an aliphatic diisocyanate having a carbon number of from 5 to 10, such as hexamethylene diisocyanate, trimethylhexamethylene diisocyanate and the like.

Examples of the hydroxyl group-containing (meth)acrylate used as a raw material of the (B-1) component include a hydroxy(C1 to C8)aliphatic (meth)acrylate, such as 2-hydroxyethyl (meth)acrylate, 2-hydroxypropyl (meth)acrylate, 4-hydroxybutyl (meth)acrylate, cyclohexane-1,4-dimethylol mono(meth)acrylate and the like, and an ε-caprolactone modified product thereof, such as ε-caprolactone-modified 2-hydroxyethyl (meth)acrylate and the like.

The urethane (meth)acrylate (B-1) may be used singly or in combination of two or more kinds thereof in the adhesive of the invention. The molecular weight of the urethane (meth)acrylate (B-1) is preferably from 400 to 10,000. Examples of the urethane (meth)acrylate (B-1) include an aromatic urethane acrylate UA-937 (a trade name) produced by Nippon Kayaku Co., Ltd.

The content of the (B-1) component in the adhesive is not particularly limited as far as the effect of the invention is not impaired. It is generally in a range of from 1 to 70%, and preferably in a range of from 5 to 50%. However, in the case where the adhesive of the invention contains a photopolymerization initiator and components to be added depending on necessity, the upper limit is such a value that is obtained by subtracting the contents thereof. In some cases, the content of the (B-1) component is preferably 10% or more, and more preferably 25% or more, and the upper limit may be in a range of less than 65%, and more preferably less than 50%, depending on the kind and the content of the (A) component and the kind of the (B-1) component to be used in combination, and the like.

In the adhesive of the invention, the balance other than the (meth)acrylate monomer (A) component and the urethane (meth)acrylate (B-1) component contains at least the photopolymerization initiator (C), and may further contain, depending on necessity, any one or both of the bisphenol type epoxy (meth)acrylate (B-2) and the (meth)acrylate phosphate compound (D), and (E) a (meth)acryloyl group-containing compound other than those in the foregoing and other additives. Therefore, in the case where there is no space for containing components other than the (meth)acrylate monomer (A) component and the urethane (meth)acrylate (B-1) component due to the lower limits and the upper limits of these components, the upper limits are decreased such amounts that correspond to the contents of the photopolymerization initiator (C) and the components added depending on necessity.

Specific examples of the bisphenol type epoxy (meth)acrylate (B-2) include an epoxy (meth)acrylate obtained by reacting a bisphenol A type epoxy resin, such as Epikote 828, 1001 and 1004 and the like, and a bisphenol F type epoxy resin, such as Epikote 4001, 4002 and 4003, produced by Yuka Shell Epoxy Co., Ltd., and the like, with (meth)acrylic acid, and those using a bisphenol A type epoxy resin are preferred. The bisphenol type epoxy (meth)acrylate (B-2) may be used singly or in combination of two or more kinds thereof in the adhesive of the invention. The using amount in the adhesive is preferably from 0 to 50%, and particularly preferably from 0 to 40%.

Specific examples of the photopolymerization initiator (C) used in the invention include 2,2-dimethoxy-1,2-diphenylethan-1-one, 2-methyl-1-(4-(methylthio)-phenyl)-2-morpholinopropan-1-one, 2-benzyl-2-dimethylamino-1-(4-morpholinophenyl)-butanone-1, bis(2,6-dimethoxybenzoyl)-2,4,4-trimethyl-pentylphosphine oxide, bis(2,4,6-trimethylbenzoyl)-phenylphosphine oxide, 2,4,6- trimethylbenzoyldiphenylphosphine oxide, 2-hydroxy-2-methyl-1-phenylpropan-1-one, 1-hydroxycyclohexyl phenyl ketone and the like. The component (C) may be used singly or in combination of two or more kinds thereof in the adhesive of the invention. The content in the adhesive is generally from 0.2 to 20%, preferably from 0.5 to 20%, and more preferably from 0.5 to 10%, and may be from 1 to 10% in some cases.

In the adhesive of the invention, the (meth)acrylate phosphate compound (D) is preferably used for improving the adhesiveness. Specific examples of the (meth)acrylate phosphate compound (D) may be a monoester, a diester and a triester, as far as they are (meth)acrylates having a phosphoric ester structure, and include mono(oxyethyl methacrylate) phosphate, tri(oxyethyl methacrylate) phosphate and the like. The (meth)acrylate phosphate compound (D) may be used singly or in combination of two or more kinds thereof in the adhesive of the invention. The content in the adhesive is about from 0 to 5%, preferably from 0.0001 to 3%, and more preferably from 0.001 to 3%, and is also preferably from 0.05 to 3%.

In the adhesive of the invention, the (meth)acryloyl group-containing compound (E) other than those in the foregoing may be used in combination for improving the performance. Examples thereof include phenyloxyethyl (meth)acrylate, phenyloxyethyloxyethyl (meth)acrylate, tetrahydrofurfuryl (meth)acrylate, dicyclopentenyloxyethyl acrylate, ethylcarbitol (meth)acrylate, hydroxypivalic acid neopentyl glycol di(meth)acrylate, triethylene glycol monomethyl ether (meth)acrylate, 4-hydroxybutyl (meth)acrylate, tricyclo(5,2,1,0,2,6)decanyl (meth)acrylate, 1,6-hexanediol di(meth)acrylate, bisphenol A poly(n=about 4)ethoxylate di(meth)acrylate, tripropylene glycol di(meth)acrylate, polyethylene glycol di(meth)acrylate, trimethylolpropane tri(meth)acrylate and the like. These (meth)acryloyl group-containing compound may be used singly or in combination of two or more kinds thereof in the adhesive of the invention. The content in the adhesive is about from 0 to 30%.

In the adhesive of the invention, other additives may be used in combination, such as a silane coupling agent, leveling agent, a polymerization inhibitor, a light stabilizer, an antioxidant, an antistatic agent, a surface lubricant, a filler and the like.

The adhesive of the invention can be obtained by mixing and dissolving the components at from ordinary temperature to 80° C. The cured product of the invention can be obtained by applying the adhesive of the invention to a substrate to be adhered, and then irradiating with light, such as an ultraviolet ray, a visible ray and the like, according to an ordinary procedure.

Preferred solution properties of the adhesive of the invention are a viscosity measured with a B type viscometer at 25° C. of from 100 to 700 mpa·S and an acid value of from 0.01 to 5 (mgKOH/g), and the cured product preferably has a refractive index (25° C.) of from 1.48 to 1.58 and a gel fraction of from 70 to 100%.

Upon curing the adhesive of the invention, the adhesive may be irradiated by light of from ultraviolet to near ultraviolet after being applied to a substrate. A light source is not limited as far as the light can be irradiated. Examples thereof include a low pressure, high pressure or very high pressure mercury lamp, a metal halide lamp, a (pulse) xenon lamp, an electrodeless lamp and the like.

The bonded optical disk according to the invention can be obtained in the following manner.

For example, the adhesive of the invention is applied on an optical disk substrate, to which aluminum or the like has been sputtered, a translucent reflection film, such as silver and the like, is placed on the sputtered optical disk substrate with no air being introduced into the adhesive, followed by being bonded by such a method as spin coating or the like, and then light of from ultraviolet to near ultraviolet is irradiated from one side or both sides to cure and adhere, so as to obtain the bonded optical disk according to the invention.

In the case where an optical disk substrate having a translucent reflection film formed with a material, such as silicone, silver, a silver alloy and the like, that is unstable comparing to gold is bonded to another optical disk substrate with the adhesive of the invention, it is preferred that the film thickness of the adhesive layer is from 1 to 100 μm, and preferably from 40 to 70 μm. The application method is not limited as far as such conditions are satisfied. Examples thereof include a spin coating method, a 2P method, a roll coating method, a screen printing method and the like.

EXAMPLE

The invention will be described in more detail with reference to examples below.

Ultraviolet ray-curable adhesives having compositions shown in Table 1 were mixed and dissolved to prepare adhesives according to the invention.

The codes for the compositions shown in the table are as follows.

| | |
|---|---|
| UA-937: | aromatic urethane acrylate, produced by Nippon Kayaku Co., Ltd. |
| BP-4EA: | bisphenol A poly(n = about 4)ethoxylate diacrylate, produced by Kyoeisha Chemical Co., Ltd. |
| 4EG-A: | tetraethylene glycol diacrylate, produced by Kyoeisha Chemical Co., Ltd. |
| R-684: | tricyclodecanedimethylol diacrylate, produced by Nippon Kayaku Co., Ltd. |
| SR-489: | tridecyl acrylate, produced by Sartomer Company |
| Viscoat #150: | tetrahydrofurfuryl acrylate, produced by Osaka Organic Chemical Industry, Ltd. |
| 4HBA: | 2-hydroxybutyl acrylate, produced by Nippon Kasei Chemical Co., Ltd. |
| PM-2: | bis (oxyethyl methacrylate) phosphate, produced by Nippon Kayaku Co., Ltd. |
| Irgacure 184: | 1-hydroxycyclohexyl phenyl ketone, produced by Ciba Specialty Chemicals, Inc., photopolymerization initiator |

The monomer components have the following solution resistance values (Ω·cm).

Universal Electrometer (produced by Kawaguchi Electric Works Co., Ltd.) was used for the measurement of the solution resistance.

| Name of Component | Solution resistance value (Ω · cm) |
|---|---|
| BP-4EA | $8 \times 10^9$ Ω · cm |
| 4EG-A | $7.9 \times 10^8$ Ω · cm |
| R-684 | $1.2 \times 10^{11}$ Ω · cm |
| SR-489 | $5.0 \times 10^{11}$ Ω · cm |
| Viscoat #150 | $5.8 \times 10^8$ Ω · cm |
| 4HBA | $7.5 \times 10^8$ Ω · cm |

TABLE 1

| | Example | | | Comparative Example | |
|---|---|---|---|---|---|
| | 1 | 2 | 3 | 1 | 2 |
| UA-937 | 30 | 35 | 30 | 36 | 40 |
| BP-4EA | — | — | — | 7 | 5 |
| 4EG-A | — | — | — | 8 | 28 |
| R-684 | 57 | 42 | 57 | 20 | — |
| SR-489 | 15 | 20 | — | — | — |
| Viscoat #150 | — | — | 15 | — | — |
| 4HBA | — | — | — | 24 | 19 |
| PM-2 ($\times 10^{-3}$) | 3 | 3 | 3 | 3 | 3 |
| Irgacure 184 | 0.7 | 0.7 | 0.7 | 0.7 | 0.7 |
| Viscosity (mpa · S/25° C.) | 443 | 479 | 350 | 547 | 653 |
| Acid value (mgKOH/g) | 0.3 | 0.3 | 0.3 | 0.3 | 0.3 |
| Reflection film | Au Ag | Au Ag | Au Ag | Au Ag | Au Ag |
| After 500 hours (visual observation) | o  o | o  o | o  o | o  x | o  x |

Note:
All the compositional proportions in the table are in terms of part by mass.

The compositions shown in Table 1 thus obtained were subjected to adhesion in the following steps 1 to 3.

1. 25 g of the adhesive was fed to a circular form on an inside periphery of an aluminum-sputtered DVD substrate.

2. A silver translucent reflection film (Ag) was placed on the sputtered DVD substrate with no air being introduced in to the adhesive, followed by being bonded by spin coating at 2,000 rpm for 4 seconds. A gold translucent reflection film (Au) was also bonded to the sputtered DVD substrate under the same conditions.

3. Irradiation was made from the side of the silver or gold translucent reflection film by a high pressure mercury lamp (80 W/cm) at 300 mJ/cm² to cure and adhere.

After the adhesion, the DVD substrates to which the silver or gold translucent reflection film had been adhered were allowed to stand under circumstances of 80° C. and 85% RH for 500 hours. The state of the reflection film was visually observed. The results of the observation were indicated in terms of the following in Table 1.

O: No change was observed in the reflection film.

Δ: Slight discoloration or pin holes were observed in the reflection film.

x: Significant discoloration or pin holes were observed in the reflection film.

It is apparent from the evaluation results in Table 1 that the adhesive of the invention exerts less influence particularly on a silver translucent reflection film, and is excellent in durability.

INDUSRIAL APPLICABILITY

The adhesive of the invention provides such high durability (reliability) in a bonded optical disk using a silver or silver alloy translucent reflection film that is equivalent to the conventional bonded optical disk using gold as a translucent reflection film. Therefore, the adhesive of the invention is significantly useful as an adhesive for an optical disk applicable to increased recording capacities.

The invention claimed is:

1. An adhesive for an optical disk containing (A) a (meth)acrylate monomer having a solution resistance of $1.0 \times 10^{10}$ Ω·cm or more.

2. The adhesive for an optical disk according to claim 1, which contains (B-1) a urethane (meth)acrulate and/or (B-2) a bisphenol type epoxy (meth)acrylate, and (C) a photopolymerization initiator.

3. The adhesive for an optical disk according to claim 1 or 2, which contains (D) a (meth)acrylate phosphate compound.

4. The adhesive for an optical disk characterized in that a content of a urethane (meth)acrylate (B-1) is 10% by mass or more but less than 50% by mass, the (meth)acrylate monomer (A) having a solution resistance of $1.0 \times 10^{10}$ Ω·cm or more is 40% by mass or more but less than 90% by mass, and, as the balance, the photopolymerization initiator (C) and, depending on necessity, the (meth)acrylate phosphate compound (D) and the bisphenol type epoxy (meth)acrylate (B-2) are contained, and a content of the (meth)acrylate monomer (A) is larger than a content of the urethane (meth)acrylate (B-1).

5. The adhesive for an optical disk according to any one of claim 1 to 4, wherein the (meth)acrylate monomer (A) is at least one selected from a C8 to C18 alkyl monoacrylate, tricyclodecanedimethylol di(meth)acrylate and nonylphenoxyethyl acrylate.

6. An optical disk having a translucent reflection film comprising silicone, silver or a silver alloy, characterized in that the optical disk is a bonded optical disk comprising a substrate having the translucent reflection film bonded to another substrate with an adhesive of any one of claim 1 to 5.

7. The optical disk according to claim 6, wherein the bonded optical disk is a DVD.

* * * * *